US006315255B1

United States Patent
Chan et al.

(10) Patent No.: US 6,315,255 B1
(45) Date of Patent: Nov. 13, 2001

(54) HANDSET HOLDER

(75) Inventors: Kwok Keung Chan; Ip Pui Wah, both of Yuen Long (HK)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/141,012

(22) Filed: Aug. 26, 1998

(30) Foreign Application Priority Data

Aug. 29, 1997 (GB) .................................................. 9718279

(51) Int. Cl.$^7$ .................................................. A47B 96/06
(52) U.S. Cl. .................................. 248/221.11; 248/222.11; 248/224.51; 248/454; 248/929
(58) Field of Search .................................. 248/222.11, 221.11, 248/224.51, 223.41; 224/929; 379/454, 455

(56) References Cited

U.S. PATENT DOCUMENTS

| | | | |
|---|---|---|---|
| 4,113,217 | * 9/1978 | O'Connell | 248/222.11 |
| 4,145,583 | 3/1979 | Oshgan et al. | 179/146 R |
| 4,797,916 | * 1/1989 | Kojima | 379/454 |
| 4,957,264 | 9/1990 | Hakanen | 248/454 |
| 5,016,851 | 5/1991 | Koskinen et al. | 248/278 |
| 5,040,712 | 8/1991 | Pesonen et al. | 224/42.45 R |
| 5,113,436 | * 5/1992 | Jarvela et al. | 379/454 X |
| 5,121,863 | 6/1992 | Kotitalo et al. | 224/42.45 R |
| 5,189,698 | 2/1993 | Hakanen | 379/455 |
| 5,519,777 | * 5/1996 | Kurgan et al. | 379/455 X |
| 5,597,102 | 1/1997 | Saarikko et al. | 224/197 |
| 5,620,120 | 4/1997 | Tien | 224/199 |
| 5,708,707 | 1/1998 | Halttunen et al. | 379/446 |
| 5,822,427 | * 10/1998 | Braitberg et al. | 379/454 |
| 5,825,874 | * 10/1998 | Humphreys et al. | 379/455 X |
| 5,850,996 | * 12/1998 | Liang | 248/221.11 |

FOREIGN PATENT DOCUMENTS

| | | |
|---|---|---|
| 297 02 505U1 | 5/1997 | (DE) . |
| 297 04 614U1 | 7/1997 | (DE) . |
| 297 06 087U1 | 7/1997 | (DE) . |
| 297 08 506U1 | 9/1997 | (DE) . |
| 0 683 587 A1 | 11/1995 | (EP) . |
| 2 241 132 A | 8/1991 | (GB) . |
| WO 93/23943 | 11/1993 | (WO) . |
| WO 97/00792 | 1/1997 | (WO) . |

* cited by examiner

Primary Examiner—Ramon O. Ramirez
Assistant Examiner—Kimberly T Wood
(74) Attorney, Agent, or Firm—Perman & Green, LLP

(57) ABSTRACT

A handset holder, such as a handsfree car kit, is disclosed. The car kit comprises a cradle (21) for carrying the handset and a cradle release mechanism (22) for releasably attaching the cradle (21) to a mount (23) fixed, for example to a vehicle dashboard. The holder comprises locating means comprising a tongue and groove for guiding the tongue to a position where the cradle and mount become latched.

46 Claims, 6 Drawing Sheets

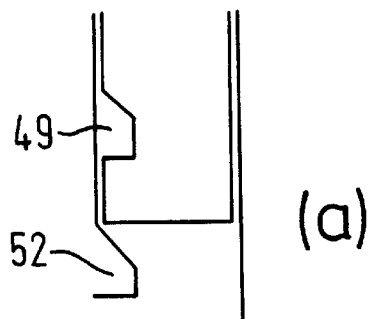
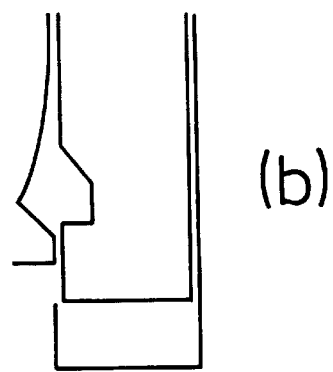
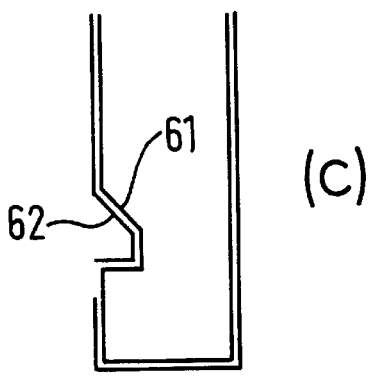
FIG. 6
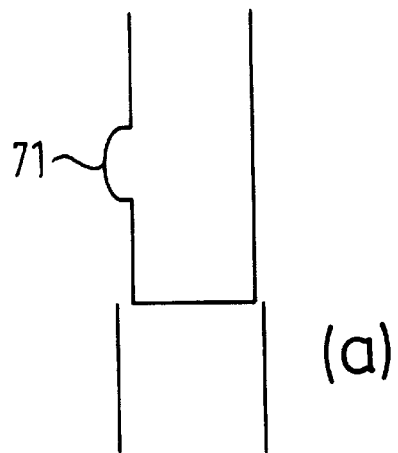
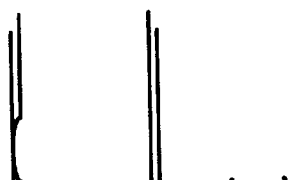
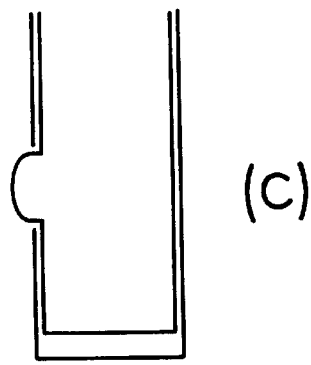
FIG. 7

HANDSET HOLDER

BACKGROUND OF THE INVENTION

The present invention relates to handset holders. In particular, it relates to the mounting of a handset cradle on a surface, such as the mounting of a car cradle on a vehicle dashboard.

Handsfree car kits for handsets such as mobile telephone handsets have been developed, which provide connection of the handset with an external antenna to improve the reception of a call.

In one type of car kit, the cradle is fixed to the mount. If the user wishes to take a call privately, as opposed to in handsfree mode, he removes the handset from the cradle. However, by doing this he sacrifices the connection to the external antenna.

Another car kit is the Nokia CARK-1, in which the cradle is magnetically coupled to the mount. This car kit is shown in FIG. 1 of the accompanying drawings. In this case, if the user wishes to take a call privately, as opposed to in handsfree mode, he picks up the cradle and handset and removes it from the vicinity of the mount. The external antenna connection is maintained. However, the cradle and mount might come apart if there is a sudden movement of the vehicle, for example by heavy braking or during an accident. If so, this may result in damage to the phone and also injury to the user. Also, the mechanism of this car kit has a large number of parts which complicates its assembly and increases manufacturing time and costs.

SUMMARY OF THE INVENTION

According to the present invention there is provided a handset holder comprising a cradle for carrying the handset, a mount for attachment to a support surface, and locating means for facilitating the removable coupling of the cradle and the mount, the locating means comprising a tongue and groove for guiding the tongue to a position where the cradle and mount become latched. Such a handset holder maintains the external antenna connection when the handset is in private mode (i.e. removed from the mount). Also, the mechanism is simple and uses few parts and yet the coupling of the cradle and mount is easy for the user. The provision of the tongue and groove significantly reduces the probability of the accidental dismounting of the cradle from the mount.

Preferably, the tongue and groove have a wide end and a narrow end, and the tongue is insertable into the groove from a position at the wide end to a position towards the narrow end where the cradle and mount become latched. This enables the user to readily couple the cradle and the mount without having to accurately align them to effect latching.

The locating means may comprise a resilient member for carrying a latch bar and preferably this resilient member and latch bar are an integral part of the housing of either the cradle or the mount. Preferably the locating means also comprises a hole in the tongue for receiving the latch bar. This arrangement enables latching of the mount and cradle using a minimum number of components.

In a preferred embodiment, the latch bar extends into the groove near its narrow end and the wall of the hole and co-operating surface of the latch bar have sloped surfaces. Such an arrangement gives a tactile indication to the user that the latch bar and hole are aligned and, for example, enables the user to push the cradle down to click it into place and thus be sure that it is latched with the mount.

The handset holder comprises user actuable means for facilitating the removal of the cradle from the mount. Preferably these means comprise a lever which acts on the resilient member to remove the latch bar from the hole and thus enable unlatching of the cradle and mount. This lever may be rotated to act on a resilient member by the user actuating a button. Preferably the lever has a sloped or ramped up cam surface which co-operates with the surface of the resilient member. This enables gentle latching and unlatching movement to be achieved, especially if the co-operating surface of the resilient member is also sloped or ramped up.

In a preferred embodiment, two buttons and levers are provided and the buttons each also have an associated arm with teeth. When the buttons are pressed the teeth of one arm are meshed with those on the other. This provides reliable synchronised button movement and further reduces component count as no spring is needed to return the buttons into their non-actuated state. The provision of opposing buttons on each side of the cradle or mount facilitates easy removal of the cradle from the mount by the user.

Preferably the cradle comprises the tongue and the mount comprises the groove, as this reduces the number of parts on the car cradle. Also, by having the buttons on the mount the phone can be removed using one hand.

BRIEF DESCRIPTION OF THE DRAWINGS

Embodiments of the present invention will now be described by way of example, with reference to the accompanying drawings, of which:

FIG. 6 shows one type of latching operation according to an embodiment of the present invention; and FIG. 7 shows an alternative latching operation according to another embodiment of the present invention.

FIGS. 2 to 5 illustrate a handset holder according to a preferred embodiment of the present invention.

DETAILED DESCRIPTION OF THE INVENTION

Figure 1:
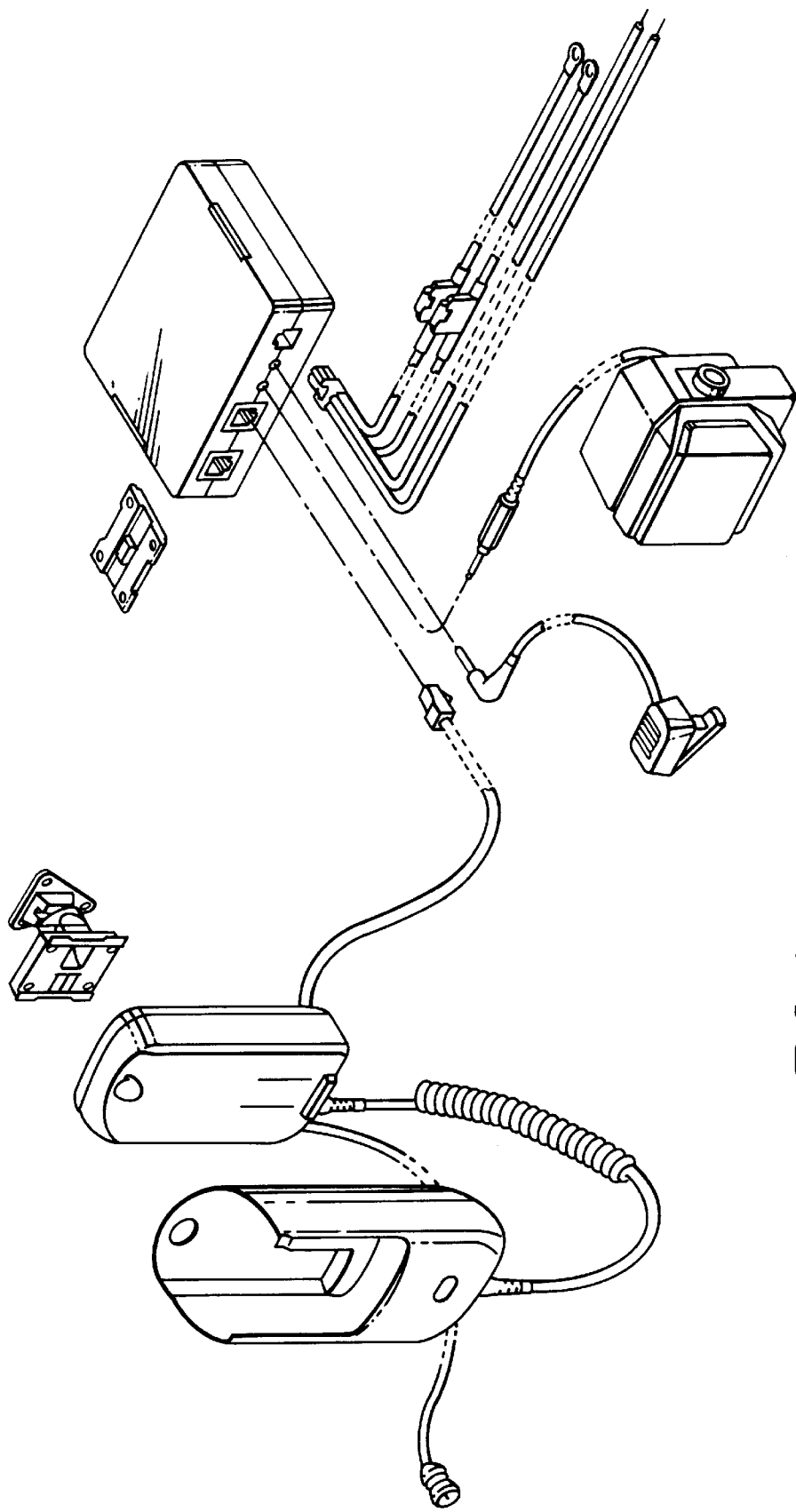
FIG. 1 shows a known handsfree car kit.
Figure 2:
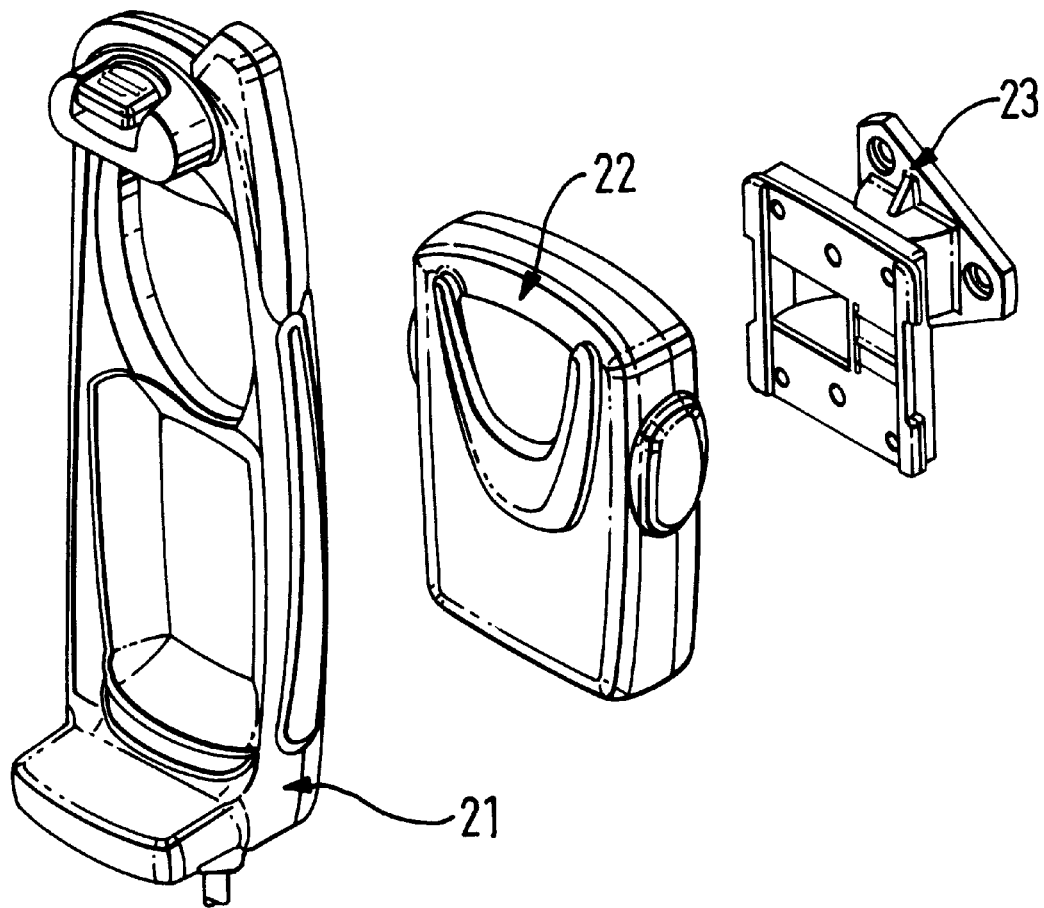
FIG. 2 illustrates a cradle, a release mount, and mount fixing according to an embodiment of the present invention.

FIG. 2 shows a cradle 21 for carrying a handset, a cradle release mount 22 for release of the coupling to the cradle 21 and a mount fixing 23, which in this case is a swivel mount, for fixing the cradle release mount 22 to a surface such as a car dash. In this arrangement, if the user wishes to take a call using handsfree mode, then he leaves the cradle in the mount. However, if he wishes to take the call privately, he removes the cradle carrying the handset from the cradle release mount 22.

Figure 3:
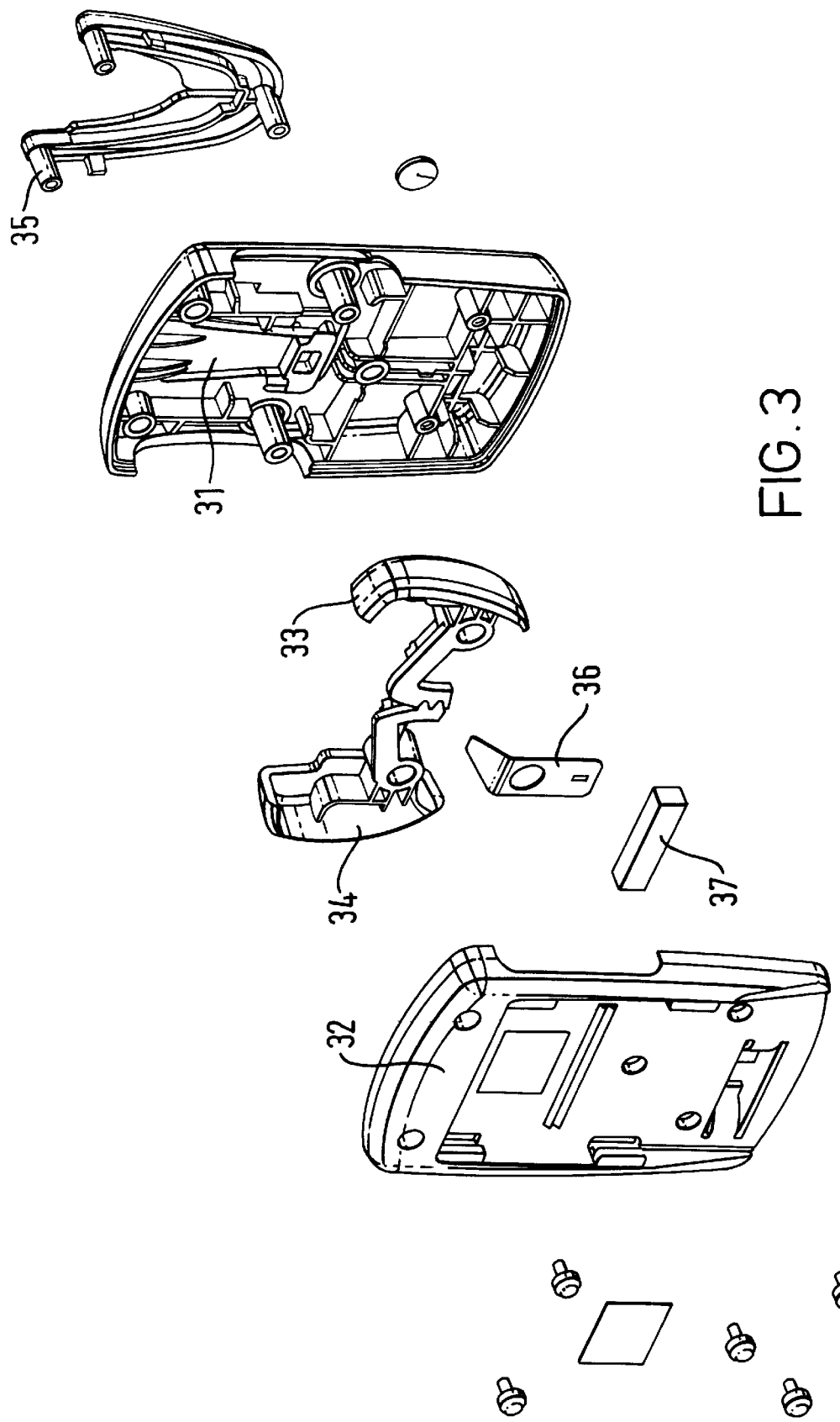
FIG. 3 is an exploded view of the cradle release mount.

FIG. 3 shows an exploded view of the cradle release mount 22. This cradle release mount 22 comprises a front cover 31, a rear cover 32, left and right buttons, referenced 33 and 34 respectively, for the user to press to release the cradle from this cradle release mount, and a U part 35. It also comprises an eject spring 36 for assisting release of the cradle from the mount, and a magnet module 37. This magnet module 37 is, for example, part of a reed relay switch for determining whether the cradle is in the mount. If so, the handsfree unit is switched to handsfree mode, and if not into private mode.

Figure 5:
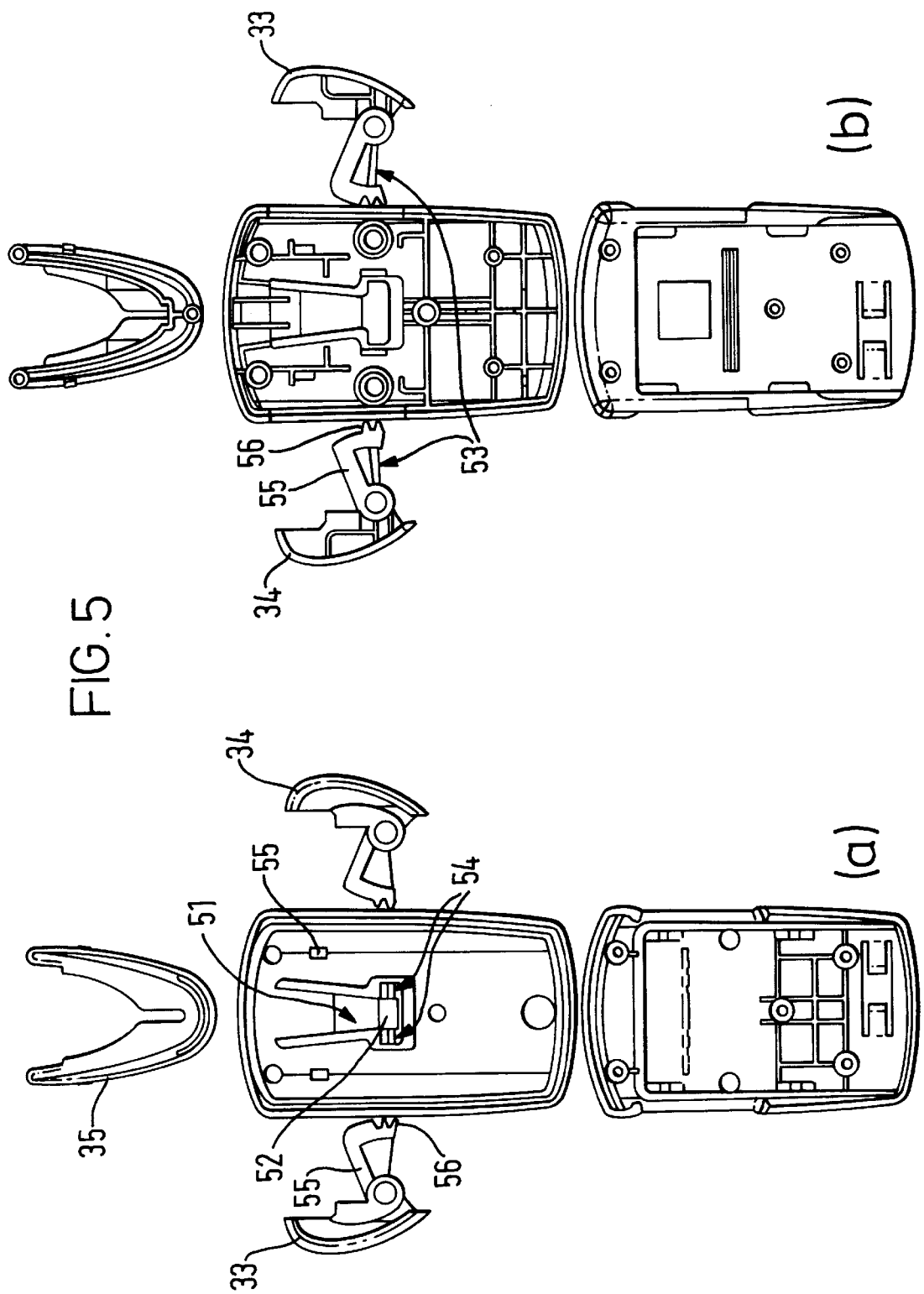
FIG. 5 shows front and rear views of the cradle release mount.

FIG. 5a shows the front view of this cradle release mount 22 and FIG. 5b shows its rear view. These figures show in more detail, the provision of latch bar 52 on a resilient member 51, both being formed as part of the front cover 31. They also show in more detail mechanisms relating to the user actuable buttons 33, 34 which assist in actuating the release of the cradle 21 from the cradle release mount 22. Each button has an associated lever 54 with a sloped or ramped up cam surface and an arm 55 with teeth 56.

The U part 35 snap fits onto the front of the mount by latching into holes 55. This U part 35 provides a groove for receiving a tongue 48 of the cradle.

Figure 4:
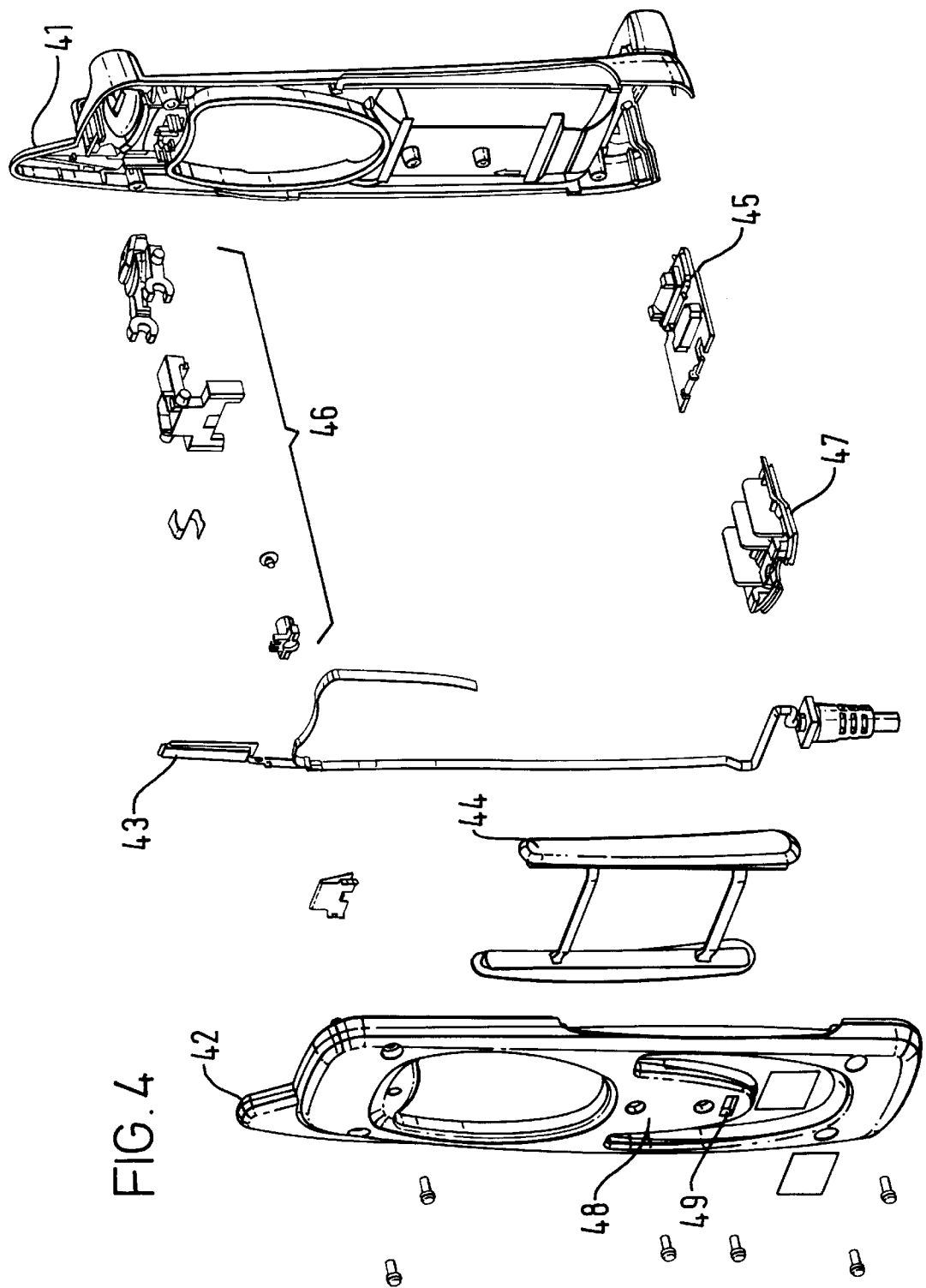
FIG. 4 is an exploded view of the cradle.

FIG. 4 shows an exploded view of the cradle 21. The cradle 21 comprises front and rear covers, referenced 41 and 42 respectively, a base cover 47, and rubber side portions 44 which assist gripping by the user. The cradle 21 also comprises an antenna coupler 43 for coupling the antenna of the handset in the cradle to an external antenna without physically contacting the antenna of the handset in the cradle 21. A system connector 45 is provided for connecting power etc. to the handset, and a clip mechanism 46 is provided for latching the handset and the cradle. The rear cover 42 of the cradle in this embodiment comprises the tongue 48 having a latch hole 49.

Attachment of the cradle 21 to the cradle release mount 22 will now be described referring to FIG. 6.

To attach the cradle 21 to the cradle release mount 22, the user first abuts the rear of the cradle to the front of the cradle release mount, and then lowers the cradle. The tongue 48 of the cradle is inserted into the groove of the cradle release mount defined by the front cover of the cradle release mount and the U part 35. Because the tongue and groove have a wide end and a narrow end, the arrangement provides self-alignment of the latch bar 52 and the latch hole 49 (see FIG. 6a).

The resilient member 51 of the cradle release mount 22 is biased towards the U part 35, so that the latch bar 52 extends naturally into the groove. As the cradle moves downwards, the end of the tongue 49 pushes against the surface 62 of the latch bar 52, causing the resilient member 48 to deform, and so removing the latch bar 52 from the path of the tongue 48. (See FIG. 6b).

Once the user has pushed the tongue 48 into the groove to the extent that the latch bar 52 and the latch hole 49 are aligned, the resilient member 51 returns to its natural bias position and the latch bar 52 fits snugly in the latch hole 49. Consequently, the cradle and cradle release mount are latched. (See FIG. 6c).

In this embodiment the latch hole 49 is positioned towards the bottom of the tongue 48 so that it can be slid into the groove with little or no force applied to it by the user, until the narrow end of the tongue contacts the portion of the latch bar in its path. Then the user must apply force to cause deformation of the resilient member, so that the cradle clicks into place. This gives a tactile indication to the user that latching has occurred.

Unlatching the cradle from the mount is provided by deforming the resilient member 51, so that the latch bar 52 is removed from the latch hole 49. It is then retained in a deformed position whilst the tongue is in contact with the latch bar. Once free of the latch bar, the tongue is removed from the groove and the resilient member returns to its natural bias position. Sloping surfaces 61, 62 of the latch bar and latch hole provide smooth unlatching.

The resilient member 51 is deformed to enable unlatching to occur in response to the user actuating the buttons 33 and 34 of the cradle release mount. The pressing of these buttons results in the rotation of their associated levers 53 and arms 55. When the buttons are pressed, the associated levers rotate to a position between the front cover of the mount and resilient member, causing the resilient member to deform and move away from the U part, and thus withdrawing the latch bar from the latch hole. In this embodiment, the levers and the portions of the resilient member in their rotational path have ramped up (sloped) cam surfaces to provide smooth movement of the resilient member. As mentioned above, the pressing of the buttons also causes rotation of their respective arms 55 and results in the meshing of the teeth 56 as shown in FIG. 3. This gear matching provides reliable synchronised button movement.

There are many equivalent mechanisms which would provide the latching function. For example, an arrangement is shown in FIG. 7 in which the tongue is provided with a spring-loaded latching bar 71 which is extended in its natural bias position as shown in FIG. 7a. In this example, the cradle release mount comprises a latch hole 72. As the tongue is lowered, the spring is deformed due to the latch bar making contact with the wall of the cradle release mount as shown in FIG. 7b, and only returns to its natural position when the latch bar and the hole are aligned as shown in FIG. 7c. Similarly, unlatching occurs by the user pulling the cradle upwards so that the spring is deformed by the contact of the latch bar with the wall of the cradle release mount.

Other embodiments can also be envisaged. For example, the tongue could appear on the cradle release mechanism and the groove on the cradle. Also, the user actuable means may be provided on the cradle Furthermore, the user actuable means may comprise a slide button or buttons, for example, as opposed to the shown push buttons.

In view of the foregoing description, it would be evident to a person skilled in the art that various other modifications may be made within the scope of the claims.

What is claimed is:

1. A vehicle handset holder for mounting a handset to a vehicle, comprising:
   a cradle for carrying the handset;
   a mount for attachment to a support surface; and
   locating means for facilitating the removable coupling of the cradle and the mount, the locating means comprising a tongue and a groove for guiding the tongue to a position where the cradle and mount become latched;
   wherein the cradle includes an antenna coupling for coupling an antenna of the handset to an external antenna of the vehicle when the handset is in the cradle.

2. A handset holder as claimed in claim 1, wherein the tongue and groove have a wide end and a narrow end, and the tongue is insertable into the groove from a position at the wide end to a position towards the narrow end where the cradle and mount become latched.

3. A handset holder as claimed in claim 1, wherein the locating means further comprises a resilient member carrying a latch bar, the resilient member being biased such that the latch bar extends into the groove.

4. A handset holder as claimed in claim 3, wherein the resilient member is an integral part of housing of the cradle or the mount.

5. A handset holder as claimed in claim 3, wherein the tongue has a hole for receiving the latch bar to latch the cradle and mount.

6. A handset holder as claimed in claim 5, wherein a wall of the hole has a sloped surface which generally conforms to a sloped surface of the latch bar.

7. A handset holder as claimed in claim 3, wherein the latch bar extends into the groove near its narrow end.

8. A handset holder as claimed in claims 3, further comprising user actuable means for facilitating unlatching of the cradle and mount.

9. A handset holder as claimed in claim 8, wherein the user actuable means comprises a lever which acts on the resilient member to substantially remove the latch bar from the groove.

10. A handset holder as claimed in claim 9, wherein the user actuable means further comprises a button which effects rotation of the lever to act on the resilient member when actuated by a user.

11. A handset holder as claimed in claim 9, wherein the lever has a sloped cam surface which co-operates with a surface of the resilient member.

12. A handset holder as claimed in claim 11, wherein the said surface of the resilient member is sloped.

13. A handset holder as claimed in claim 10, wherein the user actuable means comprise two of the buttons, and two of the associated levers which are rotated by actuating the two buttons.

14. A handset holder as claimed in claim 13, wherein the buttons each have an associated arm with teeth arranged such that their teeth mesh when the buttons are actuated by a user.

15. A handset holder as claimed in claim 1, wherein the cradle comprises the tongue and the mount comprises the groove.

16. A handset holder as in claim 1, wherein the antenna coupling in the cradle couples the handset antenna to the external antenna without physical contact between the antenna coupling and the handset antenna.

17. A handset holder comprising:
a cradle for carrying the handset;
a mount for attachment to a support surface;
locating means for facilitating the removable coupling of the cradle and the mount, the locating means comprising a tongue, a groove for guiding the tongue to a position where the cradle and mount become latched, and a resilient member with a latch bar thereon extending into the groove for latching the cradle to the mount; and
user actuable means for unlatching the cradle and mount, the actuable means comprising a lever, and a button connected to the lever for rotating the lever when the button is actuated, wherein the lever acts on the resilient member to substantially remove the latch bar from the groove when the lever is rotated.

18. A handset holder comprising:
a cradle for carrying the handset;
a mount for attachment to a support surface;
locating means for facilitating the removable coupling of the cradle and the mount, the locating means comprising a tongue, a groove for guiding the tongue to a position where cradle and mount become latched, and a resilient member with a latch bar thereon extending into the groove for latching the cradle and mount; and
user actuable means for unlatching the cradle and mount, the actuable means comprising two buttons connected to two levers, the two levers being rotated when one of the two buttons is actuated, wherein the two levers act on the resilient member to substantially remove the latch bar from the groove when the two levers are rotated.

19. A handset holder as claimed in claim 17, wherein the tongue and groove have a wide end and a narrow end, and the tongue is insertable into the groove from a position at the wide end to a position towards the narrow end where the cradle and mount become latched.

20. A handset holder as claimed in claim 17, wherein the resilient member is an integral part of a housing of the cradle or the mount.

21. A handset holder as claimed in claim 17, wherein the tongue has a hole for receiving the latch bar to latch the cradle and mount.

22. A handset holder as claimed in claim 21, wherein a wall of the hole has a sloped surface which generally conforms to a sloped surface of the latch bar.

23. A handset holder as claimed in claim 17, wherein the latch bar extends into the groove near its narrow end.

24. A handset holder as claimed in claim 17, wherein the lever has a sloped cam surface which co-operates with a surface of the resilient member.

25. A handset holder as claimed in claim 24, wherein said surface of the resilient member is sloped.

26. A handset holder as claimed in claim 17, wherein the user actuable means comprises two of the buttons and two of the associated levers which are rotated by actuating the two buttons.

27. A handset holder as claimed in claim 26 wherein the buttons each have an associated arm with teeth arranged such that their teeth mesh when the buttons are actuated by a user.

28. A handset holder as claimed in claim 17, wherein the cradle comprises the tongue and the mount comprises the groove.

29. A handset holder as claimed in claim 18, wherein the tongue and groove have a wide end and a narrow end, and the tongue is insertable into the groove from a position at the wide end to a position towards the narrow end where the cradle and mount become latched.

30. A handset holder as claimed in claim 18, wherein the resilient member is an integral part of a housing of the cradle or the mount.

31. A handset holder as claimed in claim 18, wherein the tongue has a hole for receiving the latch bar to latch the cradle and mount.

32. A handset holder as claimed in claim 31, wherein a wall of the hole has a sloped surface which generally conforms to a sloped surface of the latch bar.

33. A handset holder as claimed in claim 18, wherein the latch bar extends into the groove near its narrow end.

34. A handset holder as claimed in claim 18, wherein the two levers each have a sloped cam surface which co-operates with a surface of the resilient member.

35. A handset holder as claimed in claim 34, wherein said surface of the resilient member is sloped.

36. A handset holder as claimed in claim 18, wherein the buttons each have an associated arm with teeth arranged such that their teeth mesh when the buttons are actuated by a user.

37. A handset holder as claimed in claim 18, wherein the cradle comprises the tongue and the mount comprises the groove.

38. A handset holder comprising:
a cradle for carrying the handset;
a mount for attachment to a support surface;
locating means for facilitating the removable coupling of the cradle and the mount, the locating means comprising a tongue, a groove for guiding the tongue to a position where cradle and mount become latched, and a resilient member with a latch bar thereon extending into the groove for latching the cradle and mount; and user actuable means for unlatching the cradle and mount, the actuable means comprising two buttons connected to two levers, and each of the two buttons having an associated arm with teeth arranged such that the teeth mesh when the buttons are actuated by a user, wherein the two levers are rotated when one of the two buttons is actuated, and wherein the two levers act on the resilient member to substantially remove the latch bar from the groove when the two levers are rotated.

39. A handset holder as claimed in claim 38, wherein the tongue and groove have a wide end and a narrow end, and the tongue is insertable into the groove from a position at the wide end to a position towards the narrow end where the cradle and mount become latched.

40. A handset holder as claimed in claim 38, wherein the resilient member is an integral part of a housing of the cradle or the mount.

41. A handset holder as claimed in claim 38, wherein the tongue has a hole for receiving the latch bar to latch the cradle and mount.

42. A handset holder as claimed in claim 41, wherein a wall of the hole has a sloped surface which generally conforms to a sloped surface of the latch bar.

43. A handset holder as claimed in claim 38, wherein the latch bar extends into the groove near its narrow end.

44. A handset holder as claimed in claim 38, wherein the two levers each have a sloped cam surface which co-operates with a surface of the resilient member.

45. A handset holder as claimed in claim 44, wherein said surface of the resilient member is sloped.

46. A handset holder as claimed in claim 38, wherein the cradle comprises the tongue and the mount comprises the groove.

* * * * *